UNITED STATES PATENT OFFICE.

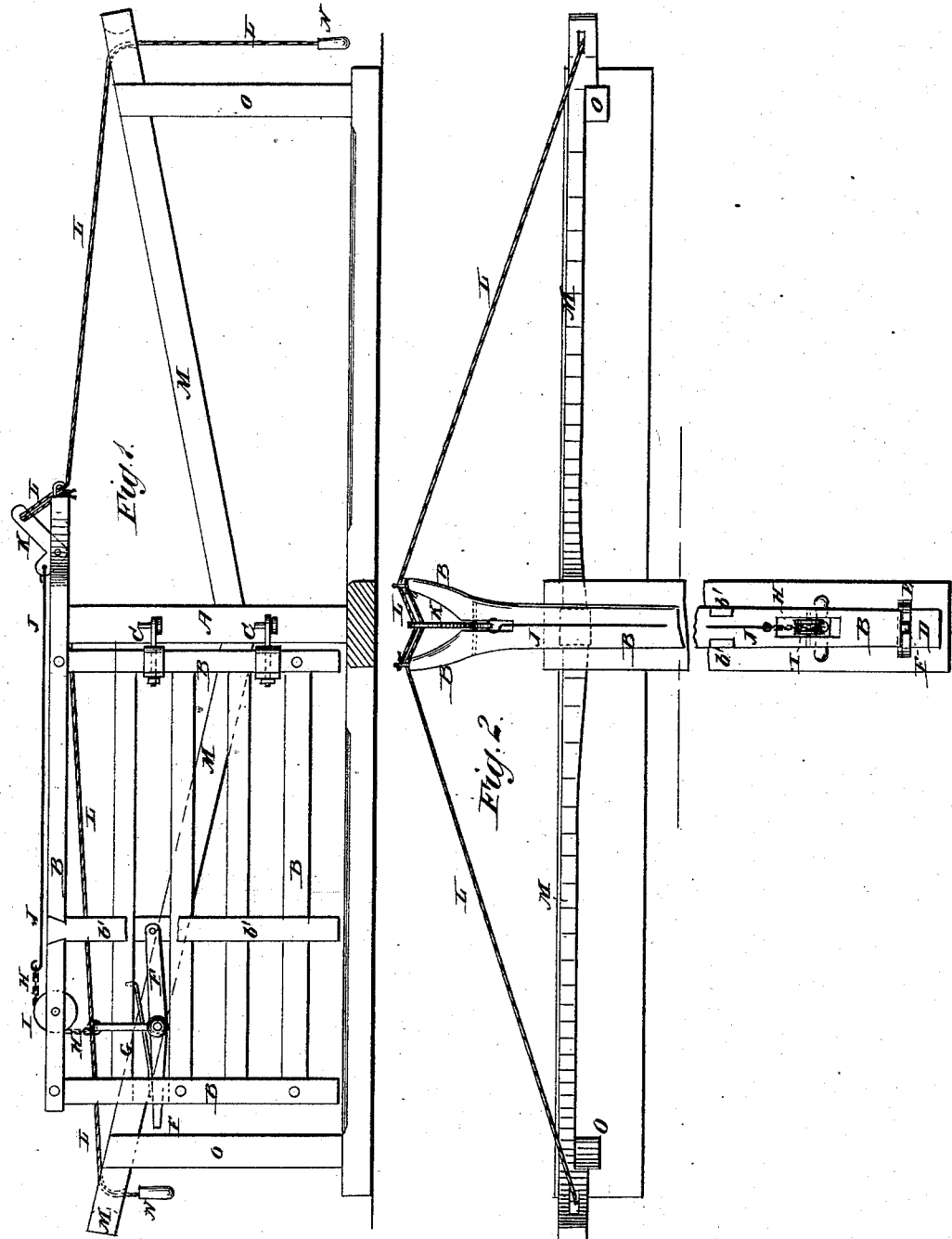

HENRY PETRY, OF RED OAK, OHIO.

IMPROVEMENT IN GATES.

Specification forming part of Letters Patent No. 216,447, dated June 10, 1879; application filed April 8, 1879.

*To all whom it may concern:*

Be it known that I, HENRY PETRY, of Red Oak, in the county of Brown and State of Ohio, have invented a new and useful Improvement in Gates, of which the following is a specification.

Figure 1 is a side view of my improved gate, shown as open. Fig. 2 is a top view of the same, shown as closed.

Similar letters of reference indicate corresponding parts.

The object of this invention is to furnish an improved gate which shall be so constructed that it may be opened and closed by a person riding in a vehicle without its being necessary to get out of the vehicle or even to stop it, and which shall be simple in construction, convenient in use, and reliable in operation.

The invention consists in the combination of the chain and rod, the pulley, the bent lever, and the cords with the spring-latch, the top bar of the gate, having its rear end forked and projecting in the rear of the rear post, and the bars and posts, as hereinafter fully described.

A represents the rear post, to which the gate B is connected by the hinges C. D is the front post, to the forward side of which is attached the catch E, to receive and hold the latch F when the gate is swung shut. The latch F passes through the front end bar of the gate B, and its rear end is hinged to and between two cross-bars, b', attached to the opposite sides of the gate B.

The latch F is held down by a spring, G, attached to it, and which rests against a bar of the gate B. To the latch F, or to a loop attached to the said latch, is attached the end of a short chain, H, which passes over a pulley, I, pivoted in a slot in the top bar of the gate B, and to its other end is attached the end of a rod, J.

The rod J passes back along the top bar of the gate, and its rear end is attached to the end of the short arm of the bent lever K, which is pivoted at its angle in a slot in the angle of the forked rear end of the top bar of the gate B.

The forked rear end of the top bar of the gate B projects in the rear of the post A, and to the ends of its branches are attached the ends of two cords, L, which pass in opposite directions through a hole in the end of the long arm of the bent lever K, through guide eyes or staples attached to the ends of the branches of the rear end of the top bar of the gate B, and extend along the side of the roadway.

The cords L pass through guide-holes in the outer ends of the bars M, and their ends hang down into such a position that they can be conveniently reached and operated by the driver without getting out of the vehicle. The ends of the cords L have weights N attached to them sufficient to keep them taut, and which serve as handles in operating them. The inner ends of the inclined bars M are attached to the post A, or to some other suitable support, and their outer parts, at a little distance from their outer ends, are attached to and supported by the posts O. The posts O are at such a distance from the rear post, A, that the horses and vehicle may be out of the way of the swing of the gate when the driver operates the cords L to open and close the said gate.

Having thus described my invention, I claim as new and desire to secure by Letters Patent—

The combination, with a swinging gate, B, having its top bar projecting beyond the rear post, A, and with its end forked to receive the bell-crank lever K, of the spring-latch F G, pulley I, chain H, rod J, cords L, and bars and posts M O, substantially as shown and described.

HENRY PETRY.

Witnesses:
JOSEPH STITT,
NEWTON KIRKPATRICK.